United States Patent [19]
Torardi

[11] Patent Number: 5,746,943
[45] Date of Patent: May 5, 1998

[54] X-RAY INTENSIFYING SCREEN BASED ON BARIUM HAFNIUM ZIRCONIUM PHOSPHATE

[75] Inventor: Carmine C. Torardi, Wilmington, Del.

[73] Assignee: Sterling Diagnostic Imaging, Inc., Brevard, N.C.

[21] Appl. No.: 810,113

[22] Filed: Feb. 25, 1997

[51] Int. Cl.[6] .............................. G01J 1/58; C09K 11/71
[52] U.S. Cl. ..................... 252/301.4 P; 252/301.4 F; 250/483.1; 430/966; 430/967
[58] Field of Search .................. 252/301.4 P, 301.4 F; 250/483.1; 430/966, 967

[56] References Cited

U.S. PATENT DOCUMENTS

| | | | |
|---|---|---|---|
| 3,513,105 | 5/1970 | Ward | 252/301.4 P |
| 3,941,715 | 3/1976 | Shidlousky | 252/301.4 |
| 4,014,813 | 3/1977 | Shidlousky | 252/301.4 |
| 4,068,128 | 1/1978 | Chenot et al. | 250/483 |
| 4,112,194 | 9/1978 | Chenot et al. | 428/539 |
| 4,826,663 | 5/1989 | Alberti et al. | 423/157 |
| 5,221,846 | 6/1993 | Apple et al. | 250/483.1 |
| 5,367,172 | 11/1994 | Beutel et al. | 250/483.1 |

FOREIGN PATENT DOCUMENTS

| | | | |
|---|---|---|---|
| 1079518 | 6/1980 | Canada | C09K 11/08 |

OTHER PUBLICATIONS

Blasse and Dirkson, "The Luminescence of Barium Titanium Phosphate, BuTi (PO$_4$)$_2$," Chem. Phys Letters, 62,1, pp. 11–20, Mar. 15, 1979.

*Primary Examiner*—Melissa Bonner
*Attorney, Agent, or Firm*—Joseph T. Guy, Jr.

[57] ABSTRACT

A novel X-ray intensifying screen is detailed comprising $$BaHf_{1-x}Zr_x(PO_4)_2$$

wherein x is 0.0 to 1.0. Further detailed is a radiographic recording element employing the same screen. This novel X-ray intensifying screen has excellent conversion efficiency to ultraviolet emission.

11 Claims, 1 Drawing Sheet

X-RAY INTENSIFYING SCREEN BASED ON BARIUM HAFNIUM ZIRCONIUM PHOSPHATE

FIELD OF INVENTION

This invention relates to radiographic intensifying screens for converting image-wise modulated X-radiation into ultraviolet and/or blue radiation. More specifically this invention is related to barium hafnium zirconium phosphate phosphors for use in a radiographic intensifying screen.

BACKGROUND OF THE INVENTION

X-ray excited phosphors are well known for their use in medical radiography. Medical X-ray films are typically sensitive to UV, blue or green light and therefore the X-radiation containing the diagnostic information must be converted to lower energy to optimally expose the film. This conversion is done by an intensifying screen comprising an appropriate phosphor as the principal active ingredient.

Phosphors which are suitable for converting X-ray energy to the appropriate lower energy are well known. The specific desirable properties include: high conversion efficiency, low granularity and a low quantity of afterglow emission. Particularly useful are phosphors for use in X-ray intensifying screens which have an emission in the near UV and blue. The most widely known phosphor for this purpose is $CaWO_4$ which has become the industry standard. There is an ongoing desire in the art to provide UV or blue emitting medical X-ray intensifying screens which have a higher speed than intensifying screens comprising $CaWO_4$. UV-emitting phosphors are desirable because, when they are used in an X-ray intensifying screen with a suitable film, a higher resolution image can be obtained relative to a similar arrangement utilizing visible-light emitting phosphors.

SUMMARY OF THE INVENTION

It is an object of the present invention to provide an X-ray intensifying screen for use in radiographic elements. Other advantages will become apparent from the teachings herein. Provided is an X-ray intensifying screen comprising a support, at least one active layer coated on the support, and the active layer comprises a binder and a phosphor corresponding to the formula

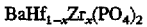

wherein x is 0 to 1.0.

A particularly preferred embodiment is a radiographic recording element comprising at least one X-ray intensifying screen in operative association with a photosensitive film element. The X-ray intensifying screen comprises; a support; at least one active layer coated on said support wherein said active layer comprises a phosphor corresponding to the formula:

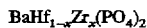

wherein x is 0.0 to 1.0.

DETAILED DESCRIPTION OF THE INVENTION

Figure 1:
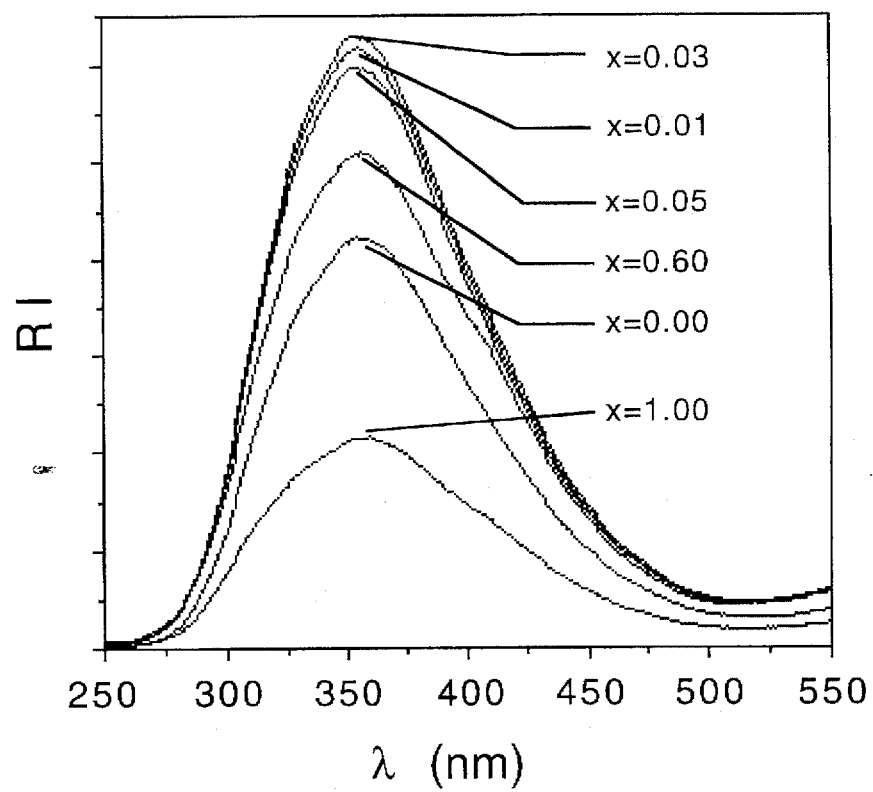
FIG. 1 illustrates the relative intensity (RI) versus wavelength ($\lambda$) of light emitted at various levels of incorporation of zirconium as indicated by x.

Barium hafnium-zirconium phosphate, $BaHf_{1-x}Zr_x(PO_4)_2$, with x=0.0–1.0, is prepared as a broad band UV-emitting X-ray phosphor with emission peak maximum at approximately 356 nm.

The X-ray intensifying screen of the present invention comprises a phosphor corresponding to the formula:

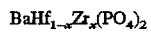

wherein x is 0 to 1.0. Preferred is a phosphor where x is 0 to 0.7, more preferred is a phosphor where x is 0.01 to 0.6 and even more preferred is a phosphor where x is 0.01 to 0.05. The most preferred phosphor is obtained when x is between 0.02 and 0.04 since this represents the maximum X-ray to light conversion efficiency. The relative intensity (RI) and emission maximum are illustrated in FIG. 1. In FIG. 1, $\lambda$ is wavelength. The X-ray excited emission spectrum of FIG. 1 was measured with molybdenum radiation at 30 kVp and 10 mA.

Preparation of the phosphor of the present invention is well documented in the art and yet the ability of the phosphor to luminesce under X-ray excitation has not been reported. The use of this phosphor in an X-ray intensifying screen has not been previously contemplated.

$BaHf_{1-x}Zr_x(PO_4)_2$ (x=0.0–1.0) is prepared by mixing and reacting stoichiometric quantities of $BaCO_3$, $HfO_2$, $ZrO_2$, and $NH_4H_2PO_4$ in an alumina crucible at 1100° C. for about 12 hours in air. A typical preparation for $BaHf_{0.97}Zr_{0.03}(PO_4)_2$ consists of mixing in an agate mortar about 3.0000 g $BaCO_3$, about 3.1041 g reactor-grade $HfO_2$, about 0.0562 g $ZrO_2$ and about 3.4958 g of $NH_4H_2PO_4$. The mixture is heated in an alumina crucible in air at about 1100° C. for about 12 hours. The X-ray powder diffraction patterns of the products prepared in this manner show the lines of $BaHf(PO_4)_2$ as provided by Powder Diffraction File, International Centre for Diffraction Data (PDF) card no. 33-150. Only a very small amount of $HfO_2$ (PDF card no. 34-104) was observed as an impurity.

The phosphor may be optionally washed with water, or another suitable solvent. If desired, the particle size of the phosphor can be decreased by grinding.

The $BaHf_{1-x}Zr_x(PO_4)_2$ crystallizes in the yavapaiite, $KFe(SO_4)_2$, structure. The $BaHf(PO_4)_2$ structure is monoclinic with a=8.550 Å, b=5.296 Å, c=7.883 Å and $\beta$=93.13° (PDF card no. 33-150). The space group symmetry is C2/m and the density is about 4.71 g/cm³.

There are a host of fluxes which are typically used to prepare phosphors. Fluxes are optional, but not necessary, for the present phosphors. Typical fluxes include the alkali metal salts, e.g., lithium, sodium, potassium, etc., of sulfates, phosphates, carbonates, metaborates, etc. The halides are also known to be beneficial when added to the flux in combination with sodium, lithium, potassium, calcium, strontium, barium and the like. Particularly suitable fluxes are described, for example, in Hedden and Zegarski, U.S. Pat. No. 4,250,365. The amount of flux is not limiting. Typically a flux is present in the reaction mixture in about 30% to about 60% by weight, preferably about 45% to about 55% by weight, based on the total weight of oxide (phosphor starting material). The optional flux and phosphor precursors are intimately mixed by any of a number of means including ball milling, shaking, or by the use of a flowing gaseous or liquid medium such as air, nitrogen, water, fluorochlorinated hydrocarbons or other inert fluids as detailed in U.S. Pat. No. 5,154,360. The mixture of phosphor starting materials, and optional flux can be fired, e.g., for at least about three hours, at elevated temperatures, e.g., from 750° C. to 1500° C., before washing to remove a majority of the flux and recovering the phosphor. The preferred temperature for firing the inventive phosphor is about 1100° C. At about 1000° C. and below the reaction is observed to be incomplete. At about 1200° C. and above the speed of the phosphor is compromised.

Additional additives may be beneficial to the properties of the phosphor. Titanium, tin and europium are detrimental to luminescence.

After firing, pulverizing and optionally washing, the phosphor is mixed with a suitable binder in the presence of a suitable solvent and coated on a support. All of these steps are described in the U.S. Pat. No. 4,225,653 and all are well-known in the prior art. In a preferred embodiment a protective topcoat is applied over the phosphor coating.

The phosphor may be dispersed in any of the commonly known binders, e.g., polyvinyl butyral or the acrylates or methacrylates, using a solvent, e.g., an alcohol, chlorinated hydrocarbon, ketone, butyl acetate, etc. Small amounts of fumed silica may be present in the phosphor to enhance handling and make the phosphor easier to pour. After dispersing in the binder, the phosphor is then cast on a conventional support, e.g., cardboard, polyester film, thin metal sheets, etc. A brightener may also be present within the phosphor and various reflective materials may be present as an underlayer or within the support itself to enhance the generation of light when the phosphor is struck by X-radiation. $TiO_2$ dispersed in a binder and cast on the support is conventional as well as the use of small particles of rutile $TiO_2$ directly in a film support. The phosphor is typically applied to the support in an amount ranging from 15 to 110 mg/cm$^2$. All of these procedures are well-known in the art. Over the phosphor layer which has been cast on the support, a conventional protective topcoat may be applied and, in fact, is preferred. These topcoats are also well-known in the prior art and serve to protect the rather expensive phosphor layer from stains and defects during the handling thereof. A particularly suitable topcoat is achieved when a styrene/acrylonitrile copolymer is coated supra to the phosphor layer and dried. Conventional supports, binders, mixing and coating processes for the manufacture of typical X-ray intensifying screens are, for example, described in Patten U.S. Pat. No. 4,387,141, the pertinent disclosure of which is incorporated herein by reference thereto.

The screens of the present invention may be used in pairs in cooperation with double-side coated medical X-ray silver halide photographic film elements, although it is contemplated that single-side coated silver halide photographic film elements may be used for some applications. If a pair of screens is used, the coating weights or phosphor of each screen may be the same or different. Thus, an asymmetric pair of screens may be used for optimal results in some applications. Medical X-ray evaluations represent the predominant commercial use for X-ray intensifying screens of this invention. A dimensionally stable, polyethylene terephthalate film support into which small amounts of rutile or anatase titanium dioxide have been incorporated is the preferred support for the X-ray intensifying screen of this invention.

In operation, the intensifying screen absorbs X-rays that impinge thereon and emits energy having a wavelength that is readily captured by the photographic silver halide X-ray film associated therewith.

In the radiological process, it is conventional to employ a photosensitive silver halide film element with the above described X-ray intensifying screens. In the practice of this invention, the silver halide element will be comprised of silver halide grains. These elements are also well-known in the prior art and the preparation of grains are also known and taught therein. The grains are generally made into an emulsion using a binder such as gelatin, and are sensitized with gold and sulfur, for example. Other adjuvants such as antifoggants, wetting and coating aides, sensitizing dyes, hardeners etc. may also be present if necessary. The emulsion may be double-side coated on the support and a thin, hardened gelatin overcoat is usually applied over each of the emulsion layers to provide protection thereto. If required, a small amount of a sensitizing dye might advantageously be added. Additionally, it is also conventional to add a sensitizing dye to tabular emulsions in order to increase their ability to respond to light. A particularly preferred spectral sensitizing dye is disclosed in U.S. Pat. No. 5,108,887.

The silver halide emulsion may employ any of the conventional halides but preferred are pure silver bromide or silver bromide with small amounts of iodide incorporated therein (e.g., 98% Br and 2% I by weight for example). Any grain morphology is suitable for demonstration of these teachings including, but not limited to, grains which are formed by splash techniques and those formed by techniques involving spray techniques (i.e., single and double jet procedures). Tabular grains are most preferred.

Tabular grain silver halide products are well-known in the prior art with exemplary methods of manufacture described by Maskasky in U.S. Pat. No. 4,400,463; Wey, U.S. Pat. No. 4,399,205; Dickerson, U.S. Pat. No. 4,414,304; Wilgus et al., U.S. Pat. No. 4,434,226; Kofron et al., U.S. Pat. No. 4,439,520; Nottorf, U.S. Pat. No. 4,722,886; and Ellis, U.S. Pat. No. 4,801,522.

After the grains are made, it is usually preferable to disperse the grains with a binder (e.g., gelatin or other well-known binders such as polyvinyl alcohol, phthalated gelatins, etc.). In place of gelatin, other natural or synthetic water-permeable organic colloid binding agents can be used as a total or partial replacement thereof. Such agents include water permeable or water-soluble polyvinyl alcohol and its derivatives, e.g., partially hydrolyzed polyvinyl acetates, polyvinyl ethers, and acetals containing a large number of extralinear—$CH_2OH$— groups; hydrolyzed interpolymers of vinyl acetate and unsaturated addition polymerizable compounds such as maleic anhydride, acrylic and methacrylic acid ethyl esters, and styrene. Suitable colloids of the last mentioned type are disclosed in U.S. Pat. Nos. 2,276,322, 2,276,323 and 2,347,811. The useful polyvinyl acetals include polyvinyl acetalaldehyde acetal, polyvinyl butyraldehyde acetal and polyvinyl sodium o-sulfobenzaldehyde acetal. Other useful colloid binding agents include the poly-N-vinyllactams of Bolton U.S. Pat. No. 2,495,918, the hydrophilic copolymers of N-acrylamido alkyl betaines described in Shacklett U.S. Pat. No. 2,833,650 and hydrophilic cellulose ethers and esters. Phthalated gelatins may also be used as well as binder adjuvants useful for increasing covering power such as dextran or the modified, hydrolyzed gelatins of Rakoczy, U.S. Pat. No. 3,778,278.

It is most preferable to chemically sensitize the grain with salts that are well known in the art. The most common sensitizers are salts of gold or sulfur. Sulfur sensitizers include those which contain labile sulfur, e.g., allyl isothiocyanate, allyl diethyl thiourea, phenyl isothiocyanate and sodium thiosulfate for example. Other non-optical sensitizers such as amines as taught by Staud et al., U.S. Pat. No. 1,925,508 and Chambers et al., U.S. Pat. No. 3,026,203, and metal salts as taught by Baldsiefen, U.S. Pat. No. 2,540,086 may also be used.

The emulsions can contain antifoggants, e.g., 6-nitrobenzimidazole, benzotriazole, triazaindenes, etc., as well as the usual hardeners, i.e., chrome alum, formaldehyde, dimethylol urea, mucochloric acid, and others as recited in *Research Disclosure*, No. 308, December 1989, Item 30819. Other emulsion adjuvants that may be added comprise matting agents, plasticizers, toners, optical brightening agents, surfactants, image color modifiers, non-halation dyes, and covering power adjuvants among others.

Thermographic imaging emulsions comprising silver salts of carboxylic acids may also be used with the screens of the present invention. Exemplary examples are provided in U.S. Pat. No. 5,028,518.

The film support for the emulsion layers used in the process may be any suitable transparent plastic. For example, the cellulosic supports, e.g., cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned. Preferred films include those formed from the polyesterification product of a dicarboxylic acid and a dihydric alcohol made according to the teachings of Alles, U.S. Pat. No. 2,779,684 and the patents referred to in the specification thereof. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. No. 3,052,543 may also be used. The above polyester films are particularly suitable because of their dimensional stability.

When polyethylene terephthalate is manufactured for use as a photographic support, the polymer is cast as a film, the mixed polymer subbing composition of Rawlins, U.S. Pat. No. 3,567,452 is applied and the structure is then biaxially stretched, followed by application of a gelatin subbing layer. Alternatively, antistatic layers can be incorporated as illustrated, for example, by Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

The emulsions may be coated on the supports mentioned above as a single layer or multi-layer element. For medical X-ray applications, for example, layers may be coated on both sides of the support which conventionally contains a dye to impart a blue tint thereto. Contiguous to the emulsion layers it is conventional, and preferable, to apply a thin stratum of hardened gelatin supra to said emulsion to provide protection thereto.

Medical X-ray film processing is well documented in the art as exemplified in Wuelfing, U. S. Pat. No. 4,741,991. A medical X-ray film to be processed is typically developed to convert latent image centers within the silver halide grain into elemental silver. Unreacted silver halide is then removed by dissolving in a suitable fixer and the film is washed and dried to provide a suitable image.

The speed in a photographic system is broadly defined as the exposure required to obtain a predetermined density under standard processing conditions. For a medical X-ray system the specific procedure is detailed in ANSI Standard, PH2.9, 1964. It is widely accepted in the art to report a relative speed wherein the speed is determined relative to PAR which is arbitrarily assigned a speed value of 100. PAR speed is determined with a standard $CaWO_4$ screen with a 84 μm phosphor thickness in combination with a Du Pont Cronex® 4 film. High Plus screens and Par screens utilize a $CaWO_4$ phosphor and are available from E. I. DuPont de Nemours, and Co. Relative speed for a medical X-ray system is determined at a density of 1.0 above base plus fog density by exposure modulation techniques as exemplified in SPSE HANDBOOK OF PHOTOGRAPHIC SCIENCE AND ENGINEERING, Woodlief, Ed.; John Wiley and Sons, New York, 1973, pp. 798–800.

EXAMPLES $BaHf_{1-x}Zr_{x}(PO_4)_2$ (x=0.0–1.0) was prepared by mixing the appropriate stoichiometric quantities of $BaCO_3$, $HfO_2$, $ZrO_2$, and $NH_4H_2PO_4$ in an alumina crucible. The mixture was heated at 1100° C. for about 12 hours in air. The phosphor was mixed with Carboset®, a carboxylated acrylic resin, as the binder and an X-ray intensifying screen was prepared by coating the phosphor/binder mixture onto a non-luminescent support at a phosphor coating weight of approximately 73 $mg/cm^2$. An exposure was made and the emission captured using a conventional photomultiplier tube. Speed is reported as relative speed versus PAR wherein PAR is set to a speed of 100. The results of Relative Speed versus x is provided in Table 1.

TABLE 1

| Relative Speed versus x. | |
|---|---|
| x | Relative Speed |
| 0.00 | 153 |
| 0.01 | 264 |
| 0.03 | 283 |
| 0.05 | 261 |
| 0.20 | 158 |
| 0.60 | 171 |
| 1.00 | 73 |

The emission spectra provided in FIG. 1 and the relative speed in Table 1 clearly illustrates the utility of the X-ray intensifying screen comprising the phosphor detailed in the present invention.

I claim:

1. An X-ray intensifying screen comprising a support at least one active layer coated on said support;
  wherein said active layer comprises
    a binder; and
    a phosphor corresponding to the formula $BaHf_{1-x}Zr_{x}(PO_4)_2$ wherein x is 0 to 1.0.

2. The X-ray intensifying screen recited in claim 1 wherein x is 0.0 to 0.7.

3. The X-ray intensifying screen recited in claim 2 wherein x is 0.01 to 0.6.

4. The X-ray intensifying screen recited in claim 3 wherein x is 0.01 to 0.05.

5. The X-ray intensifying screen recited in claim 4 wherein x is 0.02 to 0.04.

6. A radiographic recording element comprising at least one X-ray intensifying screen in operative association with a photosensitive film element wherein said X-ray intensifying screen comprises;

a support;

at least one active layer coated on said support wherein said active layer comprises a phosphor corresponding to the formula:

$BaHf_{1-x}Zr_{x}(PO_4)_2$ wherein x is 0.0 to 1.0.

7. The radiographic recording element recited in claim 6 wherein x is 0.0 to 0.7.

8. The radiographic recording element recited in claim 7 wherein x is 0.01 to 0.6.

9. The radiographic recording element recited in claim 8 wherein x is 0.01 to 0.05.

10. The radiographic recording element recited in claim 9 wherein x is 0.02 to 0.04.

11. The radiographic recording element recited in claim 6 wherein said photosensitive recording element comprises silver halide.

* * * * *